(12) United States Patent
Ullmann

(10) Patent No.: US 10,986,241 B1
(45) Date of Patent: Apr. 20, 2021

(54) ADAPTIVE MESSAGES ON A MULTI-FUNCTION DEVICE

(71) Applicant: Xerox Corporation, Norwalk, CT (US)

(72) Inventor: Noah John David Ullmann, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/668,638

(22) Filed: Oct. 30, 2019

(51) Int. Cl.
*H04N 1/00* (2006.01)
(52) U.S. Cl.
CPC ..... *H04N 1/00514* (2013.01); *H04N 1/00395* (2013.01); *H04N 1/00408* (2013.01)
(58) Field of Classification Search
CPC ........... H04N 1/00514; H04N 1/00395; H04N 1/00408
USPC ....................................................... 358/1.13
See application file for complete search history.

(56) References Cited

U.S. PATENT DOCUMENTS

| 5,204,869 | A | 4/1993 | Parthasarathi | |
| 2002/0136462 | A1* | 9/2002 | Hebert, Jr. | G06K 9/222 382/246 |
| 2017/0041296 | A1* | 2/2017 | Ford | H04L 63/0421 |
| 2018/0335939 | A1* | 11/2018 | Karunamuni | G06F 3/0481 |

OTHER PUBLICATIONS

Ruvini, Jean-David & Dony, Christophe. (2001). Fourteen Learning Users' Habits to Automate Repetitive Tasks. 10.1016/B978-155860688-3/50015-4.

* cited by examiner

*Primary Examiner* — Tammy Paige Goddard
*Assistant Examiner* — Darryl V Dottin

(57) ABSTRACT

A method for changing a message that is presented on a multi-function device (MFD) is disclosed. For example, the method is executed by a processor and includes monitoring a user interaction with the MFD, determining a message is to be displayed based on the user interaction with the MFD, changing the message based on historical interactions with the message by a user and a plurality of parameters associated with the message to create an adapted message for the user, and causing the adapted message to be displayed on a display of the MFD.

16 Claims, 5 Drawing Sheets

ADAPTIVE MESSAGES ON A MULTI-FUNCTION DEVICE

The present disclosure relates generally to multi-function devices (MFDs) and relates more particularly to MFDs that have adaptive messages.

BACKGROUND

Multi-function devices (MFDs) can be used to perform a variety of different functions. For example, MFDs can be used to copy documents, print documents, fax documents, and the like. During interaction with the MFDs, users can be presented with information. However, the way information is presented to users on MFDs currently is standardized and the same for all users.

SUMMARY

According to aspects illustrated herein, there are provided a method, non-transitory computer readable medium, and an apparatus for changing a message that is presented on a multi-function device (MFD). One disclosed feature of the embodiments is a method that monitors a user interaction with the MFD, determines a message is to be displayed based on the user interaction with the MFD, changes the message based on historical interactions with the message by a user and a plurality of parameters associated with the message to create an adapted message for the user, and causes the adapted message to be displayed on a display of the MFD.

Another disclosed feature of the embodiments is a non-transitory computer-readable medium having stored thereon a plurality of instructions, the plurality of instructions including instructions which, when executed by a processor, cause the processor to perform an operation that monitor a user interaction with the MFD, determine a message is to be displayed based on the user interaction with the MFD, change the message based on historical interactions with the message by a user and a plurality of parameters associated with the message to create an adapted message for the user, and cause the adapted message to be displayed on a display of the MFD.

Another disclosed feature of the embodiments is an apparatus comprising a processor and a computer readable medium storing a plurality of instructions which, when executed by the processor, cause the processor to perform an operation that monitor a user interaction with the MFD, determine a message is to be displayed based on the user interaction with the MFD, change the message based on historical interactions with the message by a user and a plurality of parameters associated with the message to create an adapted message for the user, and cause the adapted message to be displayed on a display of the MFD.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a multi-function device (MFD) that provides adaptive messages. As discussed above, an MFD can provide information to users during interaction with the MFD. However, one type of messaging that is standardized for all users may not provide a satisfying user experience. For example, some users may find the messages annoying, may not like the size of the message presented, may not find the message helpful, and the like.

The present disclosure provides adaptive messages that may be personalized for each user or a group of users. The adaptive messages may include adaptive notifications and adaptive alerts. The adaptive messages may be personalized based on past user interactions or responses to the adaptive messages, as well as other monitored parameters.

In one embodiment, adaptive notifications may include temporary messages which may be contextual and triggered based on a user action or state change in the MFD. The adaptive notifications may be for informational purposes that do not require a response from a user. The adaptive notifications may have a fixed display time. For example, an adaptive notification may present a message that "a feature is not available" when a user attempts to select a feature to execute on the MFD.

Adaptive alerts may be interactive messages that request user intervention. The adaptive alert may be displayed indefinitely until a user response is received. For example, an adaptive alert may include a message that asks "are you sure you want to delete this recipient?" with a "yes" and "no" option that can be selected to remove the adaptive alert. The adaptive alerts can be triggered based on user actions or state changes in the MFD.

Figure 1:
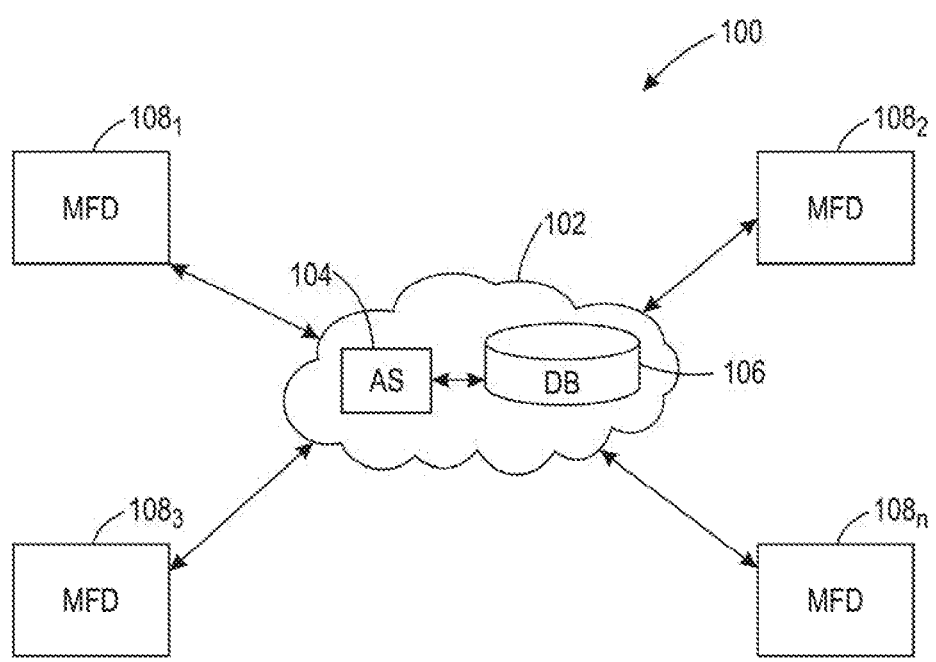
FIG. 1 illustrates a block diagram of a system of the present disclosure.

FIG. 1 illustrates an example system 100 of the present disclosure. In one embodiment, the system 100 may include a communication network 102 that includes an application server (AS) 104 and a database (DB) 106. The communication network 102 may be an Internet protocol (IP) network. The communication network 102 may be wide area network (e.g., across different geographic locations) or a local area network (e.g., a wireless network within a building).

It should be noted that the communication network 102 has been simplified for ease of explanation. The communication network 102 may include other devices or components that are not shown. For example, the communication network 102 may include routers, switches, gateways, firewalls, and the like.

The AS 104 may be a computing device that includes a processor and memory. The AS 104 may be communicatively coupled to the DB 106. The DB 106 may include a computer readable storage medium that may store various information or data. For example, DB 106 may store user profiles, user log-in credentials, and the like. When the adapted messages are created remotely by the AS 104 (as discussed below), the DB 106 may also store historical interactions, adapted messages for a particular user, and the like.

In one embodiment, the AS 104 may be communicatively coupled to one or more multi-function devices (MFDs) $108_1$-$108_n$ (hereinafter also referred to individually as an MFD 108 or collectively as MFDs 108). The MFDs 108 may be located across different geographic locations or may be located across different locations within the same building (e.g., in different rooms, on different floors, within different departments, and the like). In one embodiment, data may be transmitted between the MFDs 108 and the AS 104 to perform the functions described herein. In some embodiments, the adapted messages may be created locally by the MFD 108.

In other embodiments, the adapted messages may be created remotely by the AS 104 and transmitted to any one of the MFDs 108. For example, a user may be logged into the MFD $108_2$ and the AS 104 may transmit the adapted message to the MFD $108_2$ based on the user interaction with the MFD $108_2$, as discussed in further details below.

In one embodiment, the MFDs 108 may perform various job functions. For example, the MFDs 108 may print, copy, fax, scan, email documents, and the like. The MFDs 108 include a user interface that allows the user to make job function selections and various attributes associated with the selected job function. The user interface may provide messages to the user based on the context of the user interactions.

As noted above, previous MFDs would provide standardized messages that would be the same for all users. The present disclosure provides adapted messages that are personalized for the user based on historical interactions with the same messages. For example, for each message that may be presented by the MFDs 108, the user interaction with the message may be monitored and tracked. Based on the user's historical interactions with each message, an adapted message may be created for each message. Thus, when a particular message is to be presented to the user on the user interface of the MFD 108, the adapted message created for the user may be presented instead.

The message may be adapted in a variety of ways. For example, a message may include a notification. A notification may be triggered based on a user action or state change in the MFD 108. The notification may not be interactive and may have a fixed display time. The notification may be adapted to reduce the fixed display time for a particular user based on historical interactions, may be reduced in size, may be moved to a different location on the display of the MFD 108 automatically, and the like.

In one embodiment, the messages may include an alert. An alert may be triggered based on user actions or state changes in the MFD 108. Alerts may be persistent or may be displayed indefinitely until a user action is taken in response to the alert. The alert may be adapted to automatically make a selection based on the user's historical interactions with the alert.

For example, instead of displaying the alert, the MFD 108 may automatically make a selection and then display a different message indicating that the selection was made. The message may include an option to undo the selection. The message may be hidden as a selectable icon to not disturb the user's interaction with the MFD 108, or adapted similar to how the notification may be adapted, as discussed above.

In one embodiment, historical interactions of a user may be tracked by the AS 104. For example, if the user logs into different MFDs $108_1$-$108_n$ across different locations, the AS 104 may track the historical interactions across all MFDS 108 and create adapted messages based on the historical interactions. As a result, when a user logs into any one of the MFD 108, the AS 104 may transmit the appropriate adapted message for the user on the MFD 108 that the user is logged into. In another embodiment, the historical interactions of a user may be tracked and monitored locally by each MFD 108.

In one embodiment, the adapted messages may be created for a particular group or department. For example, rather than creating adapted messages for an individual user, the adapted messages may be created for a department (e.g., an accounting department, a payroll department, an engineering group, and the like). Thus, when users of a particular group log into an MFD 108, the users of that particular group may receive the adapted messages associated with that particular group. In other words, users from an accounting department may have an adapted notification indicating that "memory is low" displayed in one manner, and users from an engineering department may have the adapted notification that "memory is low" displayed in a different manner.

Figure 2:
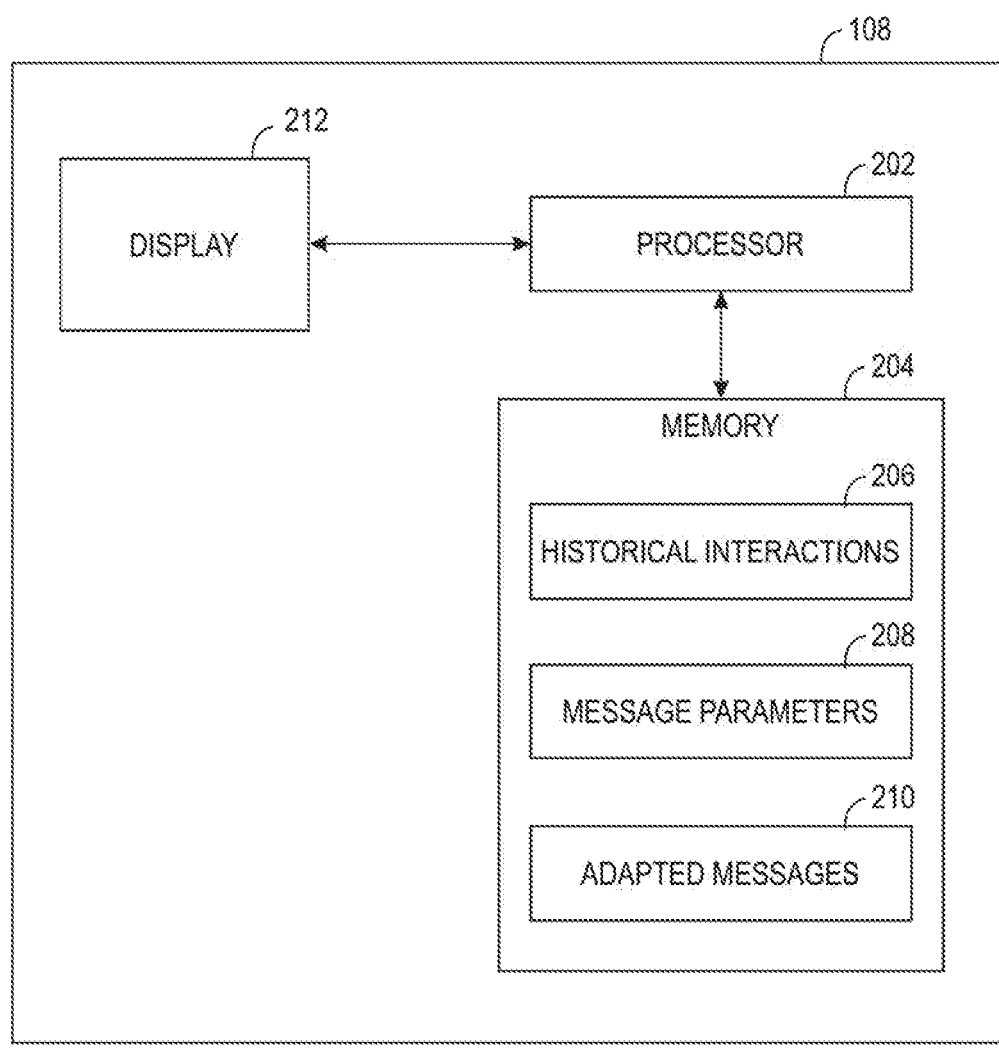
FIG. 2 illustrates a block diagram of an MFD that changes a message that is presented on the MFD.

FIG. 2 illustrates an example of the MFD 108 that is modified to perform the functions of the present disclosure. In one embodiment, the MFD 108 may include a processor 202, a memory 204, and a display 212. The processor 202 may be communicatively coupled to the memory 204, and the display 212. The processor 202 may execute instructions stored in the memory 204 to perform the functions described herein (e.g., adapting messages displayed on the MFD 108).

In one embodiment, the display 212 may be a graphical user interface (GUI). The display 212 may include a touch-screen interface and/or physical input buttons. The user may interact with various available selections on the GUI of the display 212.

In one embodiment, the memory 204 may be a non-transitory computer readable medium. The memory 204 may be a random access memory (RAM), a read only memory (ROM), a hard disk drive, a solid state drive, or any combination thereof.

In one embodiment, the memory 204 may include historical interactions 206, message parameters 208, and adapted messages 210. In one example, the historical interactions 206 may be monitored user interactions of a user or different users on an MFD 108 that can be stored. For example, each time a user interacts with one of the MFDs 108, the interaction with the MFD 108 is stored in the historical interactions 206.

In one embodiment, the historical interactions 206 may store interactions with various messages (e.g., notifications or alerts) that can be presented on the display 212. In other words, each message may have its own respective historical interactions. For example, a first message may be associated with respective historical interactions 206, a second message may be associated with respective historical interactions 206, and so forth.

In one embodiment, the historical interactions 206 for each message may be monitored over a predefined time period or a rolling time period. For example, the adapted messages 210 may be created based on historical interactions 206 collected over a few weeks, a few months, a year, and the like, a period of time or a continuously rolling time period of a few weeks, months, or year.

In one embodiment, the time period may be set by the MFD 108 or the AS 104 by learning, or collecting data. For example, based on data from various users, the MFD 108 may learn that monitoring interactions within a two week window is sufficient to capture the historical interactions 206 for a particular user and to create the adapted messages 210.

In one embodiment, the historical interactions 206 may include a time for a user to interact with the message. For example, the time may be measured based on the difference between a time the message is displayed and a time the user interacts with the message. The interaction may include clearing the message (e.g., closing a notification), moving the message to a different location on the display 212, making a selection (e.g., making a selection for an alert), and the like. In one embodiment, the historical interactions 206 may track an average time for a user to interact with the message over all interactions with a particular message.

For example, for a notification, the notification may have a default display time of 10 second before timing out. However, the user may close the notifications within an average of 3 seconds. Thus, historical interactions 206 may track that a user closes a particular notification within 3 seconds. In another example, for an alert, the historical interactions 206 may track that a user makes a selection within 5 seconds of the alert being displayed.

In one embodiment, the historical interactions 206 may include a location of where the message is displayed. For example, a default location of the message may be a center of the display 212. However, a user may move the message to an upper left corner of the display 212, or another user may move the message to a right center of the display 212, and so forth.

In one embodiment, the historical interactions 206 may include a size of the message that is displayed. For example, some users may shrink a window of the message to be smaller. Some users may increase the window of the message to be larger to make it easier to read the message, and so forth.

In one embodiment, the historical interactions 206 may include tracking previous selections that were made for a particular message. For example, the message may be an alert that requires the user to make a "yes" or "no" selection in the message. The user may always select "yes". Thus, the historical interactions 206 may store that for a particular alert, "yes" is always selected.

In one embodiment, the message parameters 208 may include values or characteristics for various messages. The combination of the historical interactions 206 and the message parameters 208 may be used to create the adapted messages 210 for each message and for each user.

For example, the message parameters 208 may include a type of message. For example, the message parameters 208 may identify a message as a notification or an alert. As defined above, a notification may be triggered based on a user interaction or state change in the MFD 108 and may be non-interactive with a fixed display time. An alert may be triggered based on a user interaction or state change in the MFD 108 and may require user interaction and may be displayed indefinitely until the user interacts with the alert.

In one embodiment, the message parameters 208 may include a priority level or urgency level of the message. In one embodiment, the priority level may be a numerical value (e.g., 1 being the highest priority and 5 being the lowest priority, or any other type of priority value system). For example, a system restart message may have a highest priority level 1 and a notification that a feature is not available within a particular selection may have a lowest priority level 5. In other examples, notifications may generally have a lower priority level of 4 and alerts may generally have a higher priority level of 2, and so forth.

In one embodiment, based on the historical interactions 206 and/or the message parameters 208, adapted messages 210 may be created for each message. In other words, each message that can be presented by the MFD 108 on the display 212 can be associated with an adapted message 210 for a particular user. Said another way, if the MFD 108 includes 100 possible messages (e.g., notifications and alerts), the MFD 108 may create 100 corresponding adapted messages 210 for a particular user or group of users.

In one embodiment, the adapted messages 210 may change various parameters or characteristics of the original or standard version of a message. For example, a notification may be initialized to display for 10 seconds based on the priority level of the notification. The notification may be set to be displayed in the center of the display 212 and may have an initial size in a 3 inch by 3 inch window.

However, the historical interactions 206 of a first user with the notification may indicate that the first user interacts with the notifications on average within 5 seconds. In addition, the first user moves the notification to an upper right hand corner of the display 212 and reduces the size of the window to a 2 inch by 2 inch window. Thus, the adapted message 210 for the notification may change the display time to 5 seconds (instead of the initial 10 seconds) and may display the notification in the upper right hand corner of the display 212 (instead of the center of the display 212) in a 2 inch by 2 inch window (instead of a 3 inch by 3 inch window).

Moreover, the historical interactions 206 of a second user with the same notification may indicate that the user interacts with the notifications within 3 seconds and closes the notification window. Thus, the adapted message 210 for the same notification for the second user may change the display time to 3 second and may automatically close the window.

In another example, an alert may be initialized to display a "yes" and "no" selection indefinitely until a user makes a selection in the alert based on the priority level of the alert. The alert may be set to be displayed in the center of the display 212.

However, the historical interactions 206 may indicate that a user interacts with the alert on average within 8 seconds. In addition, the user always selects the "yes" option. As a result, the adapted message 210 for the alert may automatically select the "yes" option within 9 seconds such that the user does not have to be interrupted while interacting with the MFD 108. In addition, the adapted message 210 for the alert may include a subsequent notification indicating that the "yes" option was selected with an option to undo. In one embodiment, if the undo option is selected, the adapted message 210 may be reset to the initial message.

In other words, the adapted messages 210 of a particular message may be personalized, or unique, for different users. Said another way, the message may be adapted to be presented in a different fashion for different users based on the adapted messages 210 that are created for each user.

In one embodiment, the adapted messages 210 to convey the same information may be personalized for two different users. In other words, an adapted message 210 may include an alert asking the user to confirm a deletion. In one embodiment, a first user may prefer short messages and a second user may prefer more detailed messages. Thus, the adapted message 210 for the first user may indicate "are you sure you want to delete this user?". However, the adapted message 210 to ask the same question for the second user may indicate "Are you sure you want to delete this user? This action cannot be undone."

In one embodiment, when the adapted message 210 is about to be created for a particular message, the user may be presented with different options or different possible adapted messages 210 that can be displayed. Thus, a user may select the desired string or way the information is presented. The user selection may then be stored and the adapted message 210 may be presented based on the user selection.

As noted above, the AS 104 may also be used to create and store the adapted messages 210. Thus, when a user logs into any MFD 108 in communication with the network 102, the AS 104 may transmit the adapted message 210 for the particular user on the MFD 108 that the user is logged into.

In one embodiment, a user may interact with a particular MFD 108 (e.g., MFD $108_1$). After the MFD $108_1$ stores the historical interactions 206 of a user and then creates the adapted messages 210, the MFD $108_1$ may provide an option to the user to share the adapted messages 210 with the other MFDs $108_2$-$108_n$. As a result, the user may receive a consistent response across the fleet of MFDs 108. In one embodiment, if the user allows the MFD $108_1$ to share the adapted messages 210, the MFD $108_1$ may send the historical interactions 206 and the adapted messages 210 to the AS 104. The other MFDs $108_2$-$108_n$ may then retrieve the adapted messages 210 from the AS 104 when the user logs into a different MFD $108_2$-$108_n$.

In one embodiment, the MFDs 108 or the AS 104 may include an option to reset the adapted messages 210. For example, the reset may delete all adapted messages 210 and historical interactions 206 and provide the default messages to the user. For example, the user's preferences may change over time and the user may no longer want the adapted messages 210 that were previously created for the user. In one embodiment, the user may selectively reset the adapted messages 210. For example, a list of all the adapted messages 210 that have been created may be presented to the user. The user may then select one-by-one the adapted messages 210 that the user would like to reset to the default message.

In one embodiment, the user may reset a category of the adapted messages 210. For example, the user may reset a group of alerts, a group of notifications, and the like.

It should be noted that the MFD 108 has been simplified for ease of explanation and may include additional components that are not shown. For example, the MFD 108 may include a wired or wireless communication interface. The communication interface may establish a communication path to the AS 104 via the network 102. The MFD 108 may include a feeder module, a printing module, a finishing module, printing fluid (e.g., printheads, toner, marking material, and the like), a digital front end (DFE), and the like.

Figure 3:
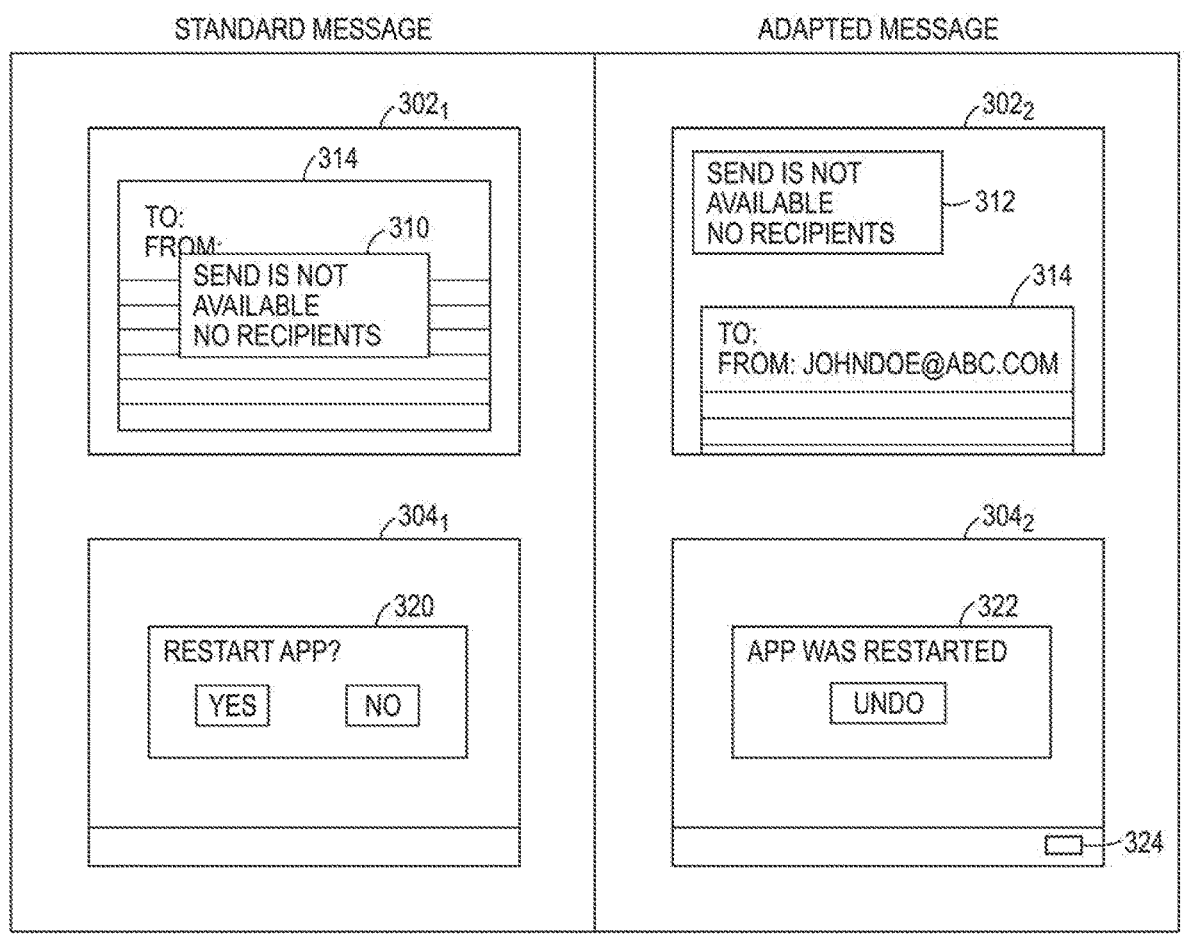
FIG. 3 illustrates example screenshots of the message and the adapted message for a user presented on the MFD of the present disclosure.

FIG. 3 illustrates example screenshots of the standard message and the adapted messages 210 of the present disclosure. For example, the standard messages are illustrated in screenshot $302_1$ and $304_1$ on the left side of FIG. 3. The adapted messages 210 are illustrated in screenshot $302_2$ and $304_2$ on the right side of FIG. 3.

In one example, before the historical interactions 206 are monitored and tracked for a user a notification 310 may be initially displayed. For example, the notification 310 may be displayed for 10 seconds in a center of the display. The notification 310 may also be displayed on top of working window 314.

However, over time, the historical interactions 206 of a user interacting with the notification 310 may be monitored, tracked, and stored, as described above. Based on the historical interactions 206, an adapted notification 312 may be created and presented, as shown in the screenshot $302_2$. For example, the adapted notification 312 may be displayed for 5 seconds and moved to an upper left hand corner of the display based on the historical interactions 206.

In one embodiment, other parameters may be changed for the adapted notification 312. For example, the size of the window that presents the adapted notification 312 may be changed. In one embodiment, the working window 314 and the adapted notification 312 may be automatically rearranged to prevent the user from being interrupted while interacting with the MFD 108. For example, rather than having the adapted notification 312 block a portion of the working window 314, the working window 314 may be resized or moved such that the adapted notification 312 does not overlap with the working window 314.

In one embodiment, the adapted notification 312 may cause the working window 314 associated with the adapted notification 312 to be modified. For example, the adapted notification 312 may indicate that there are no recipients listed in the outgoing email in the working window 314. The adapted notification 312 may also cause the "to:" field in the working window 314 to be highlighted to indicate the context of the adapted notification 312.

In one embodiment, an alert 320 may be presented in the screenshot $304_1$ before historical interactions 206 are monitored and tracked for the alert 320. In one embodiment, the alert 320 may be related to restarting an app with a "yes" and "no" option. Over time, the historical interactions 206 of the user interacting with the alert 320 may be monitored, tracked, and stored, as described above. Based on the historical interactions 206, an adapted alert 322 may be created and presented, as shown in the screenshot $304_2$. For example, the adapted alert 322 may automatically select the "yes" option to restart the app and display a message indicating that the app was restarted.

In one embodiment, the adapted alert 322 may include an "undo" option in case a user ever changes his or her mind for responding to the alert 320. In one embodiment, when the "undo" option is selected, the historical interactions 206 for the alert 320 may be deleted or reset. The user interactions with the alert 320 may then be monitored and tracked again until the adapted alert 322 is created.

In one embodiment, the adapted alert 322 may be shown as an icon 324. The icon 324 may blink or flash to attract the user's attention indicating that an adapted alert 322 is available. For example, the adapted alert 322 may be hidden in a system tray or other portion of the display 212 rather than being shown in a window. As a result, the user may continue to interact with the MFD 108 without interruption. The user may then select the icon 324 to see that the app was automatically restarted as part of the adapted alert 322 at the user's convenience.

As a result, the MFDs 108 of the present disclosure may track user interactions with messages that may be presented by the MFDs 108. Based on historical interactions 206 of the user, the MFDs 108 may create adapted messages 210 (e.g., the adapted notification 312 or the adapted alert 322 illustrated in FIG. 3). Thus, rather than using standardized messages for all users, the messages may be adapted to be personalized for each user. Thus, different users may be presented with the same message in different ways in the display 212 of the MFD 108 based on the historical interactions 206 with the message.

Figure 4:
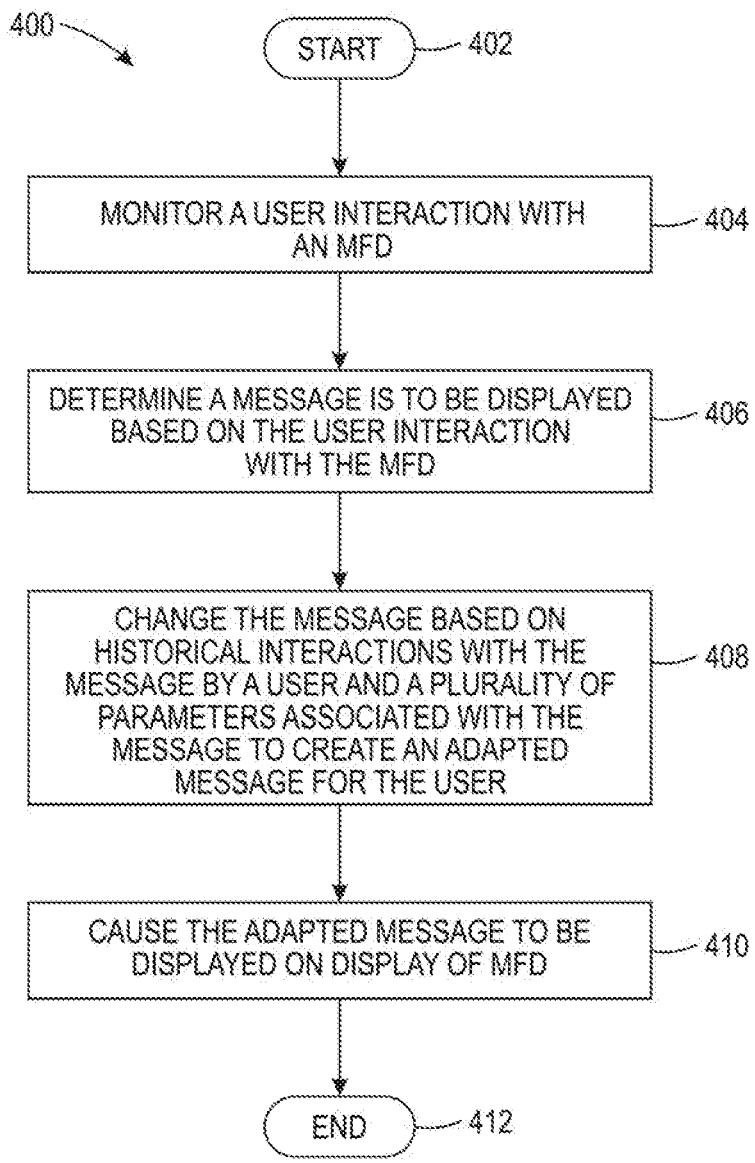
FIG. 4 illustrates a flowchart of an example method for changing a message that is presented on a multi-function device (MFD) of the present disclosure.
Figure 5:
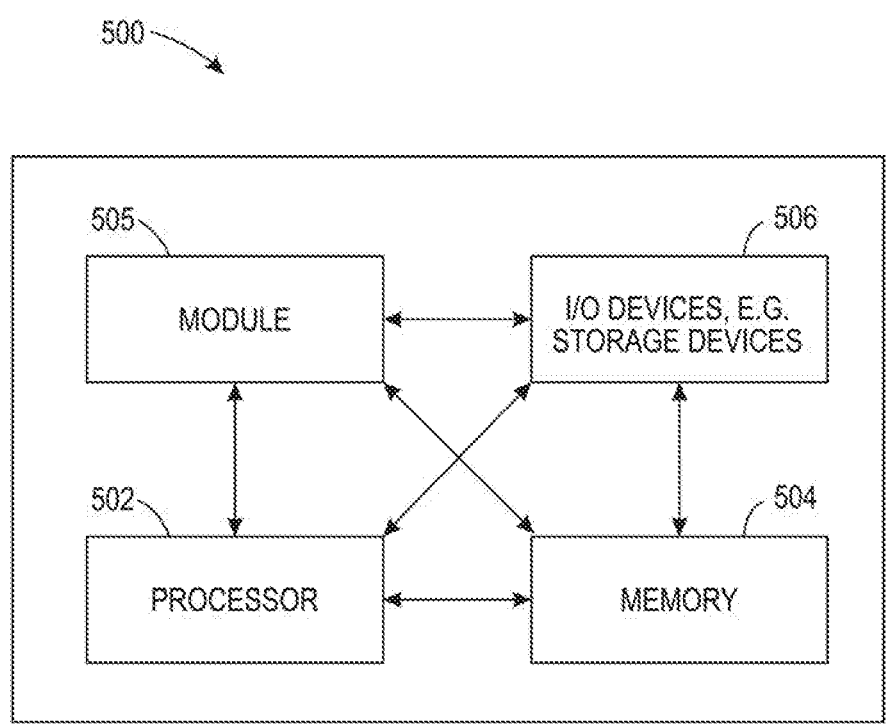
FIG. 5 illustrates a high-level block diagram of an example computer suitable for use in performing the functions described herein.

FIG. 4 illustrates a flowchart of an example method 400 for changing a message that is presented on an MFD of the present disclosure. In one embodiment, one or more blocks of the method 400 may be performed by the AS 104, the MFD 108, or a computer/processor that controls operation of an MFD as illustrated in FIG. 5 and discussed below.

At block 402, the method 400 begins. At block 404, the method 400 monitors a user interaction with the MFD. For example, the user may be making a selection for a particular job function or features of a job function that is to be executed by the MFD. In one embodiment, the user interactions may be monitored locally by the MFD or may be monitored remotely by an application server.

At block 406, the method 400 determines that a message is to be displayed based on the user interaction with the MFD. For example, the user may select an option that is not available that causes a message to be displayed. For example, if a user attempts to delate a file, a message confirming the file should be deleted may be associated with the interaction. In another example, a user may attempt to send an email that indicates an attachment should be included, but no attachment is included. A notification may be associated with the attempt to send the email without an attachment. In another example, an application may be frozen or malfunctioning. An alert may be associated with the malfunctioning application asking if the user would like to restart the application with options to select "yes" or "no".

At block 408, the method 400 changes the message based on historical interactions with the message by a user and a plurality of parameters associated with the message to create an adapted message for the user. For example, the historical interactions of the user with the message during previous interactions may be monitored, tracked, and stored over a period of time. For example, the period of time may be a continuous rolling time period.

In one embodiment, the historical interactions may be accessed in local memory of the MFD. In one embodiment, the historical interactions may be accessed from an application server in a network of MFDs. For example, when a user logs into an MFD, the MFD may communicate with the application server to access historical interactions of the user with various messages to change the message and create the adapted message.

In one embodiment, the historical interactions with the message that is presented that are monitored may include an amount of time between when the message is displayed and when the user interacts with the message (e.g., how quickly the user closes the message, makes a selection that is available in the message, moves the message to a different location on the display, resizes a window of the message, and the like). In one embodiment, the historical interactions can be stored to be used to create adapted messages for the user.

In one embodiment, the message may be associated with various parameters or characteristics. For example, the characteristics may include a type of message (e.g., a notification or an alert). The parameters may include a priority level of the message, a default display time for the message, and the like.

In one embodiment, the adapted message may be created based on the historical interactions and the parameters associated with the message. For example, the message may be changed to display for a shorter time period or a longer time period based on the historical interactions and the parameters of the message. The message may be changed to be displayed in a different location or not shown at all. For example, the message may be changed to be displayed as an icon that the user may read at a later time at his or her convenience. The message may be changed to automatically make a selection based on the historical interactions, and so forth.

In one embodiment, the MFD or the AS may notify the user that the adapted message has been created. The notification may allow the user to accept the adapted message, select a particular adapted message if different possible adapted messages are presented to the user, and so forth.

In one embodiment, when the adapted message is presented to the user, the adapted message may provide an indication that the adapted message is different than the default message. For example, the adapted message may be presented in a different color, with an "adapted" icon, a unique sound, or other type of indication that the adapted message was created.

As noted above, different adapted messages may be created for different messages. For example, if the MFD has 100 possible messages that can be displayed, then the MFD may create 100 different adapted messages (e.g., one adapted message for each possible message).

In addition, different adapted messages may be created for different users or groups for the same original message. For example, the same message may be adapted differently for different users based on the users' respective historical interactions. Thus, a notification may be adapted in one way for a first user and the same notification may be adapted in a different way for a second user.

At block 410, the method 400 causes the adapted message to be displayed on a display of the MFD. For example, instead of displaying the standard message that is associated with the interaction that triggered the message, the method 400 may display the adapted message instead. At block 412, the method 400 ends.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for changing a message that is presented on an MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for changing a message that is presented on an MFD (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for changing a message that is presented on an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for changing a message that is presented on a multi-function device (MFD), comprising:
    monitoring, by a processor, user interactions of a user with a message of at least one MFD over a period of time to obtain historical interactions with the message by the user, wherein the historical interactions that are monitored comprise an average of an amount of time between a time at which the message was displayed and an interaction with the message by the user, previous selections made by the user, a location on a display that the message is moved to by the user, and an amount a user changes a size of the message that is displayed;
    creating, by the processor, an adapted message of the message based on the historical interactions with the message by the user;
    detecting, by the processor, a log-in of the user on the MFD;
    monitoring, by a processor, a user interaction with the MFD;
    determining, by the processor, the message is to be displayed based on the user interaction with the MFD; and
    causing, by the processor, the adapted message of the message to be displayed on a display of the MFD.

2. The method of claim 1, wherein the adapted message comprises an adapted notification.

3. The method of claim 2, further comprising:
    changing an amount of time for which the adapted notification is displayed.

4. The method of claim 2, further comprising:
    changing a location on the display at which the adapted notification is displayed.

5. The method of claim 1, wherein the adapted message comprises an adapted alert.

6. The method of claim 5, further comprising:
    automatically making a selection for the user and hiding the adapted alert.

7. The method of claim 1, wherein the historical interactions are stored on a remotely located server.

8. The method of claim 7, wherein the historical interactions are tracked over a plurality of different MFDs in different physical locations and stored in the remotely located server.

9. A non-transitory computer-readable medium storing a plurality of instructions, which when executed by a processor, cause the processor to perform operations for changing a message that is presented on a multi-function device (MFD), the operations comprising:
    monitoring user interactions of a user with a message of at least one MFD over a period of time to obtain historical interactions with the message by the user, wherein the historical interactions that are monitored comprise an average of an amount of time between a time at which the message was displayed and an interaction with the message by the user, previous selections made by the user, a location on a display that the message is moved to by the user, and an amount a user changes a size of the message that is displayed;
    creating an adapted message of the message based on the historical interactions with the message by the user;
    detecting a log-in of the user on the MFD;
    monitoring a user interaction with the MFD;
    determining the message is to be displayed based on the user interaction with the MFD; and
    causing the adapted message of the message to be displayed on a display of the MFD.

10. The non-transitory computer-readable medium of claim 9, wherein the adapted message comprises an adapted notification.

11. The non-transitory computer-readable medium of claim 10, further comprising:
    changing an amount of time for which the adapted notification is displayed.

12. The non-transitory computer-readable medium of claim 10, further comprising:
    changing a location on the display at which the adapted notification is displayed.

13. The non-transitory computer-readable medium of claim 9, wherein the adapted message comprises an adapted alert.

14. The non-transitory computer-readable medium of claim 13, further comprising:
    automatically making a selection for the user and hiding the adapted alert.

15. The non-transitory computer-readable medium of claim 9, wherein the historical interactions are stored on a remotely located server.

16. The non-transitory computer-readable medium of claim 15, wherein the historical interactions are tracked over a plurality of different MFDs in different physical locations and stored in the remotely located server.

* * * * *